Feb. 22, 1927.
H. FLACH
1,618,419
AUTOMOBILE BUMPER
Filed Jan. 21, 1926
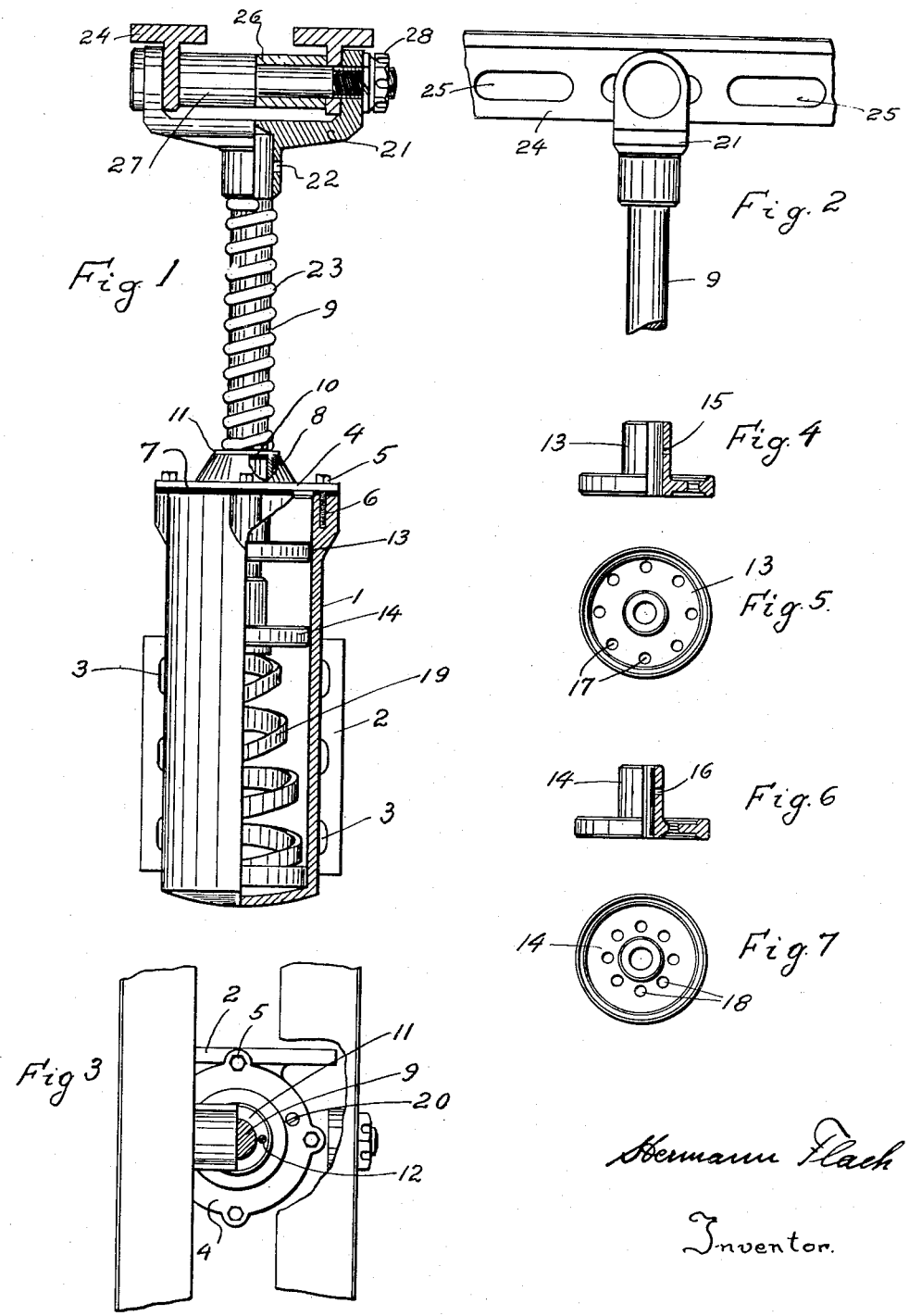

Patented Feb. 22, 1927.

1,618,419

UNITED STATES PATENT OFFICE.

HERMANN FLACH, OF CALUMET CITY, ILLINOIS.

AUTOMOBILE BUMPER.

Application filed January 21, 1926. Serial No. 82,736.

The invention relates to automobile-bumpers. The main object of the invention is to provide an automobile-bumper adapted to decrease the force exerted on the automobile body by an accidental collision to such a degree, that fatal accidents are practically eliminated by the use of the present invention. A further object of the invention is to provide a bumper adapted to be attached to the front and rear end respectively of a vehicle. A pair of bumpers may be provided at the front or rear end of an automobile or on both ends, and the bumpers of each pair may be actuated independently of each other or in unison. A still further object of the invention is to provide a bumper having a plurality of means for receiving and absorbing any shock or the like produced by a collision or the like, so that the greatest force of such a shock will be absorbed before the effect thereof reaches and affects the body of the automobile. The bumper according to this invention is of strong and durable construction, but at the same time adapted to be produced economically. It can be easily and quickly mounted on and detached from an automobile and the bumper be easily and readily disassembled, any defective part replaced and the bumper reassembled.

The accompanying drawings illustrate the invention in its preferred form, like reference characters in the drawings, denoting like parts.
Fig. 1 is an elevation partly shown in section of the bumper in accordance with the invention, Fig. 2 is a fragmentary side view of Fig. 1,
Fig. 3 is a top view plan of Fig. 1, Fig. 4 is a side view of one piston,
Fig. 5 the bottom plan view of Fig. 4,
Fig. 6 is the side view of the other piston and
Fig. 7 the bottom plan view of Fig. 6.
The bumper according to the present invention has a cylinder 1. Said cylinder may be made as a steel casting or if desired of pressed steel and is designed to contain oil. The cylinder 1 is provided with a base plate 2, which may be formed as an integral part of said cylinder. The base plate has a plurality of elongated slots 3 therein. In the drawing six such slots are shown, but any desired number may be provided.
These slots receive bolts (not shown) wherewith the bumper may be detachably fastened to any automobile or other vehicle, (not shown). A cover 4 closes the end of the cylinder and is fastened thereto by means of a plurality of bolts 5, which engage threaded holes 6 in the rim of the cylinder. A gasket 7 is inserted between the cover and the cylinder to close the latter oil proof. An opening 8 is provided in the cover and a piston rod 9 extends through the cover and through said opening into the cylinder. The opening is adapted to receive a piston rod packing 10, which is forced into the opening and maintained in position by means of a plate 11 held in position by screws 12. Two pistons 13 and 14 respectively are mounted on the piston rod in spaced relation to each other. In the hub of each piston a radially extending hole 15 and 16 respectively is provided adapted to receive a fastening means (not shown), such as a taper pin holding the piston in position on the piston rod. Each piston head has a series of holes 17 and 18 respectively, circularly arranged therein. The radii of the circles formed by said holes are of different lengths as is clearly shown in Figs. 5 and 7. A spirally and conically extending spring 19 of very strong resilient steel is inserted in the oil cylinder and abuts with one of its ends the surface of the inner end wall of the cylinder and with its other end the lower piston, so as to force the pistons and the piston rod outwardly of the cylinder. An opening, closed by the screw 20, is provided in the cylinder cover to permit of filling the cylinder with oil. A bumper head 21 is mounted on the outer end of the piston rod, a taper pin 22 extending through the hub of the bumper head and the piston rod and holding the bumper head on the piston rod. A strong spiral spring 23 surrounding the piston rod is inserted between the cover and the bumper head also forcing the piston rod outwardly of the cylinder. The outer part of the bumper head is forked as shown in Fig. 1. The bumper bars 24 are T-shaped and have holes 25 therein. The forked parts of the bumper head are provided with holes registering with each other. A bolt 26 extends through the holes in the forked portions of the bumper head and through a slot 25 of each bumper bar and a spacer tube 27 surrounds the bolt and abuts both bumper bars holding them in the desired position. Castellated nuts 28 are mounted on the bolts 26.

The bumper may be fastened directly by means of bolts to the chassis, the bolts extending through the holes 3 in the base plate 2 and through some holes specially provided therefor in the frame. If a car equipped with bumpers of the described kind should collide with another vehicle the shock of the collision will be initially absorbed by the two springs 19 and 23, the force of the collision tending to compress said springs. The springs being compressed the piston rod will be forced into the cylinder, which is filled with oil. The oil behind the inner piston 14 must flow through the holes 18 in said piston to permit an inward movement of the piston rod and the oil between the two pistons must flow through the holes 17 in the outer piston 13. The oil flowing through the holes 18 can not flow straight on and through the holes 17 but will hit the inner surface of the piston 13, because the radii of the two annuli formed by the holes are of different lengths.

The above description shows clearly, that the invention fulfills its objects. A plurality of means absorbs the shock of any collision before it affects the body proper of the automobile.

What I claim as new and desire to secure by Letters Patent is:

1. In an automobile bumper of the class described, a cylinder adapted to be fastened to the automobile, oil in the cylinder, a piston rod extending into the cylinder, a plurality of pistons mounted on the piston rod, and snugly fitting into the cylinder, a series of holes annularly arranged in each piston, the radii of such annuli being of different lengths, and a bumper bar fastened to the outward end of the piston rod.

2. In an automobile bumper of the class described, a cylinder adapted to be fastened to an automobile, oil in the cylinder, a piston rod extending into the cylinder, a plurality of perforated pistons mounted on the piston rod and snugly fitting into the cylinder, the perforations in each piston being arranged in a circle, said circles having radii of different lengths, a spring disposed in the cylinder and abutting the inner piston and the inner end wall of the cylinder and a bumper bar attached to the outward end of the piston rod.

3. In an automobile bumper of the class described, a cylinder adapted to be fastened to an automobile, oil in the cylinder, a plurality of perforated pistons snugly fitting into and movable in said cylinder, the perforations in each piston being arranged in the shape of a circle and the circles in the different pistons having radii of different lengths, a piston rod carrying the pistons and extending outwardly of the cylinder, a conical spiral spring inserted in the cylinder and abutting the inner end wall of the cylinder and the inner piston and a bumper bar fastened to the outward end of the piston rod.

4. In an automobile bumper of the class described, a cylinder adapted to be fastened to an automobile, oil in the cylinder, a plurality of perforated pistons, snugly fitting into and slidable in the cylinder, the perforations of each piston being arranged in the shape of a circle and the circles of the different pistons having radii of different lengths, a piston rod carrying the pistons and extending outwardly of the cylinder, a bumper bar attached to the outward end of the piston rod and a spiral spring surrounding the piston rod and inserted between the bumper bar and the cylinder top.

5. In an automobile bumper of the class described, a cylinder adapted to be fastened to an automobile, oil in the cylinder, a plurality of pistons snugly fitting into and slidable in the cylinder, a series of perforations in each piston, each series being arranged annularly and the annuli of the different pistons having radii of different lengths, a piston rod carrying the pistons and extending outwardly of the cylinder, a bumper bar on the outward end of the piston rod, a conical spiral spring in the cylinder and abutting the inner cylinder end and the inner piston, and a spiral spring surrounding the piston rod and disposed between the bumper bar and the outer cylinder end.

6. In an automobile bumper of the class described, a cylinder, a base plate on the cylinder and adapted to be fastened to an automobile, oil in the cylinder, a plurality of pistons snugly fitting into and slidable in the cylinder, each piston having a series of perforations therein, arranged in circular shape, the circles of the different pistons having radii of different lengths, a piston rod carrying the plurality of pistons and extending outwardly of the cylinder, a bumper bar attached to the outer end of the piston rod, a conical spiral spring disposed in the cylinder and abutting the inner end of the cylinder and the inner piston and a spiral spring surrounding the piston rod and disposed between the outer end of the cylinder and the bumper bar.

7. In an automobile bumper of the class described, a cylinder, a base plate on the cylinder and adapted to be fastened to an automobile, oil in the cylinder, a plurality of perforated pistons slidable in the cylinder, the perforations of the different pistons arranged in circles of different radii, a piston rod carrying the plurality of pistons and extending outwardly of the cylinder, a conical spring disposed in the cylinder and abutting the inner end wall of the cylinder and the inner piston, a bumper head fastened to the outer end of the piston rod and a bumper bar carried by the bumper head.

8. In an automobile bumper of the class described, a cylinder, a base plate on the cylinder and adapted to be fastened in an automobile, oil in the cylinder, a plurality of perforated pistons slidable in the cylinder, the perforations of the different pistons being arranged in circles of different radii, a piston rod carrying the plurality of pistons and extending outwardly of the cylinder, a conical spiral spring arranged in the cylinder and abutting the inner piston and the inner end wall of the cylinder, a bumper head fastened to the outer end of the piston rod, a bumper bar carried by the bumper head and a spiral spring surrounding the piston rod and abutting the outer end wall of the cylinder and the bumper head.

9. In an automobile bumper of the class described, a cylinder adapted to be fastened to an automobile, a plurality of perforated pistons slidable in said cylinder, a piston rod carrying the plurality of pistons and extending outwardly of the cylinder, oil in the cylinder, a bumper head fastened to the outer end of the piston rod, the bumper head having its outer end forked and the fork portions being provided with registering openings, a pair of bumper bars arranged between the forked head portions, the bars having elongated openings therein, a bolt extending through the openings in the fork portions and in the bumper bars, a spacer tube surrounding said bolt and disposed between and abutting the bars, a spiral spring surrounding the piston rod and abutting the outer end wall of the cylinder and the bumper head and a conical spiral spring located in the cylinder and abutting the inner piston and the inner end wall of the cylinder.

In witness whereof I hereunto subscribed my name.

HERMANN FLACH.